Figure 1:
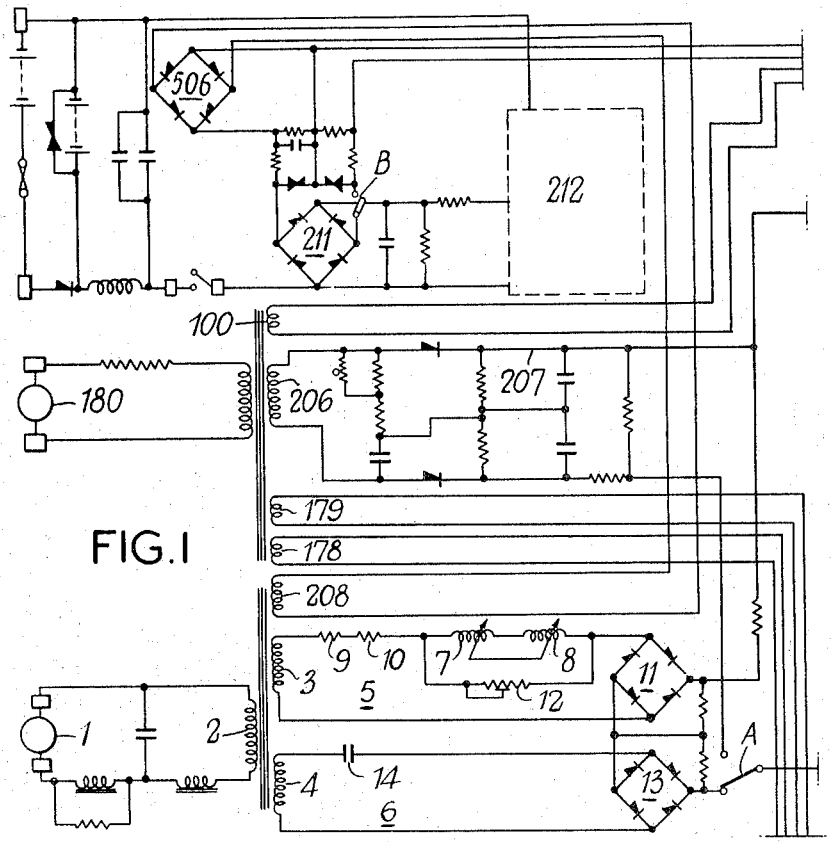

Jan. 3, 1967   B. E. BLACKABY   3,295,317
FUEL CONTROL SYSTEM FOR GAS TURBINE ENGINES
Filed Aug. 9, 1965   7 Sheets-Sheet 1

Inventor
Benjamin Edward Blackaby
By
Karl W. Flocks
Attorney

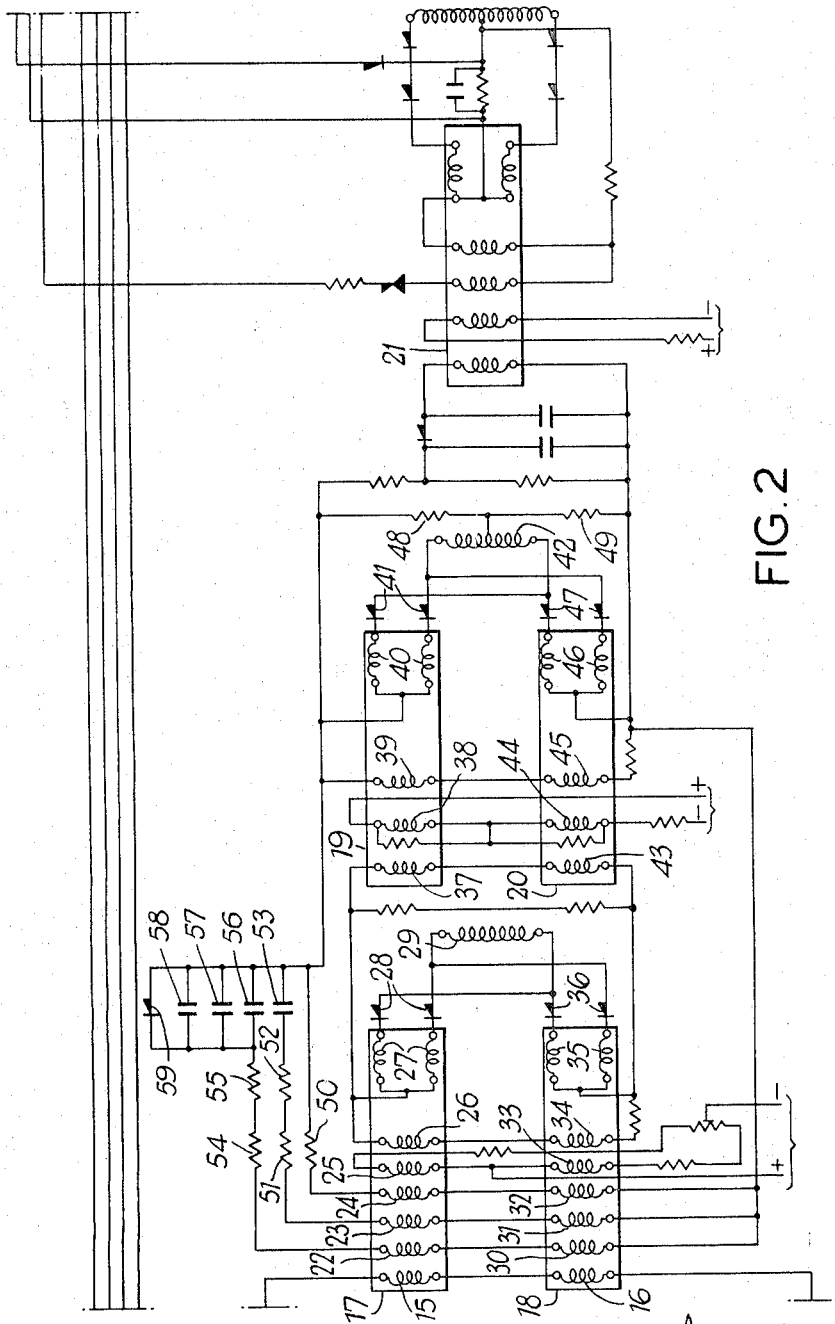

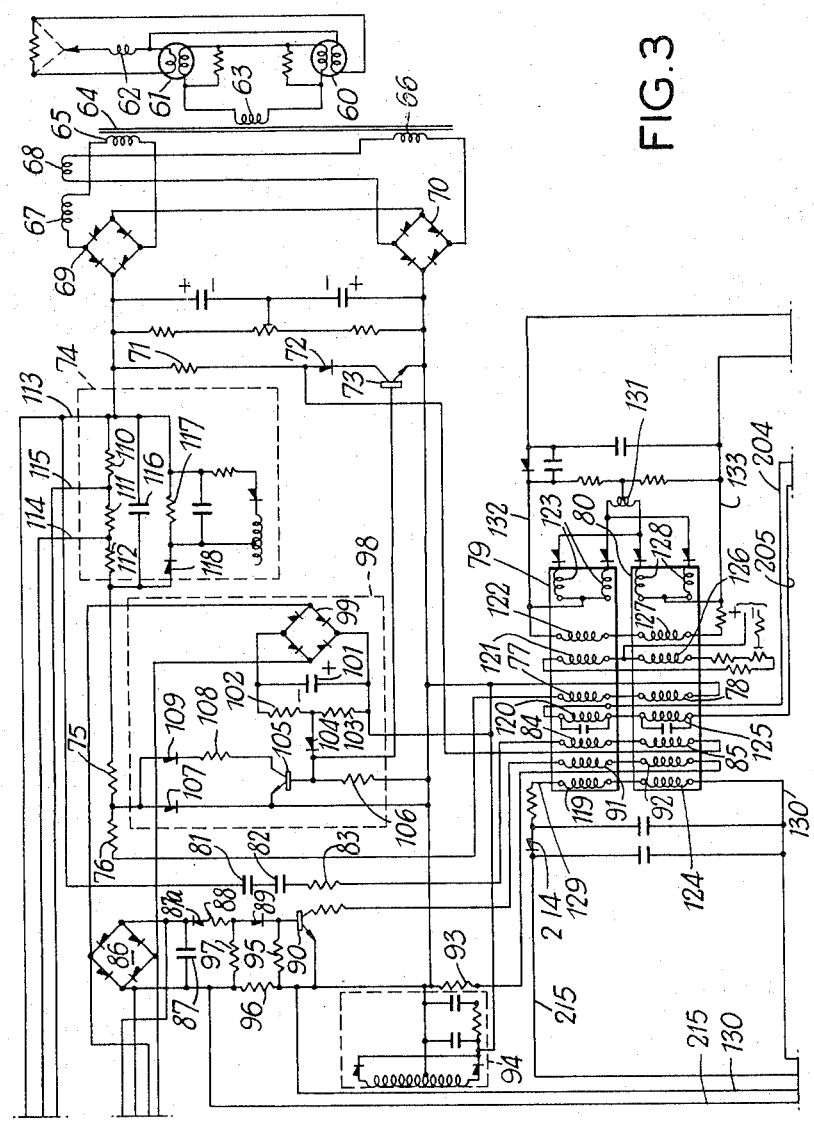

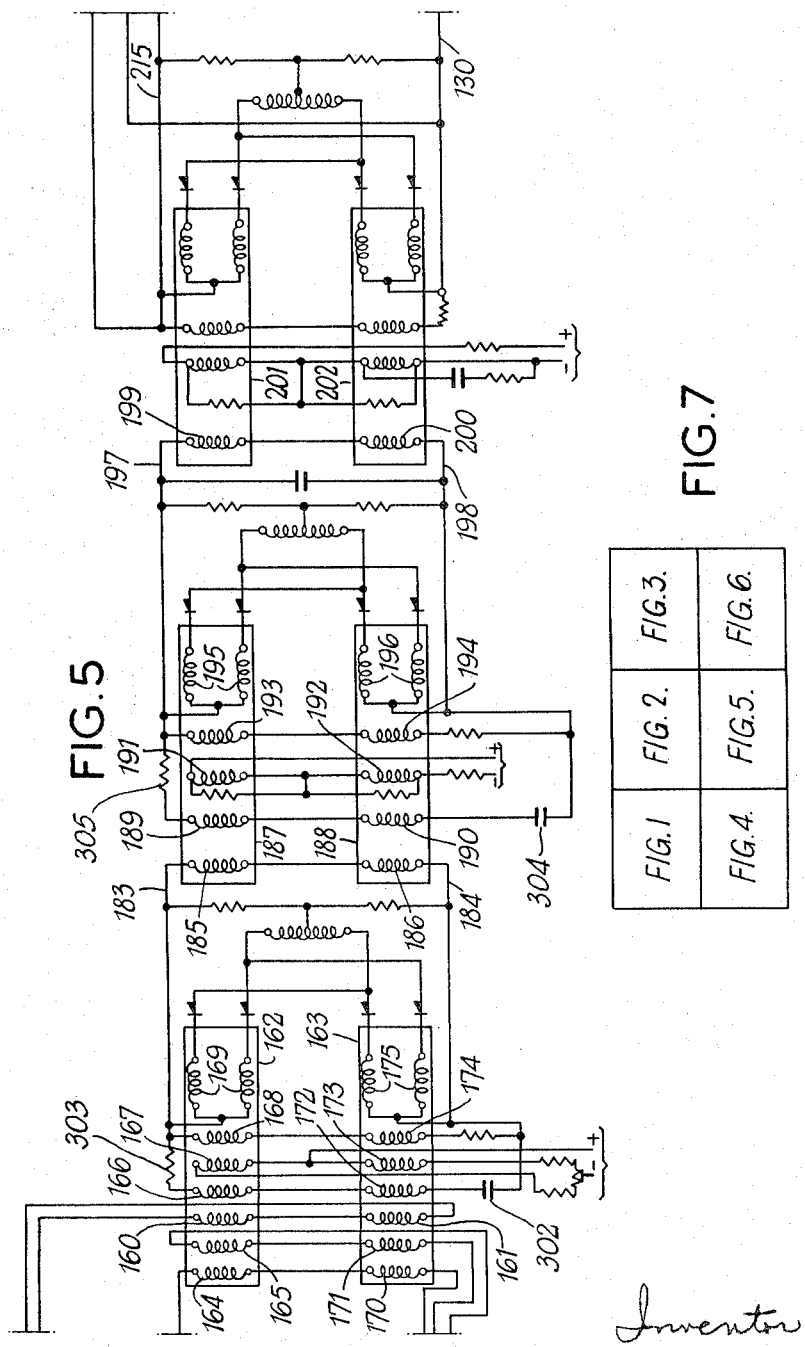

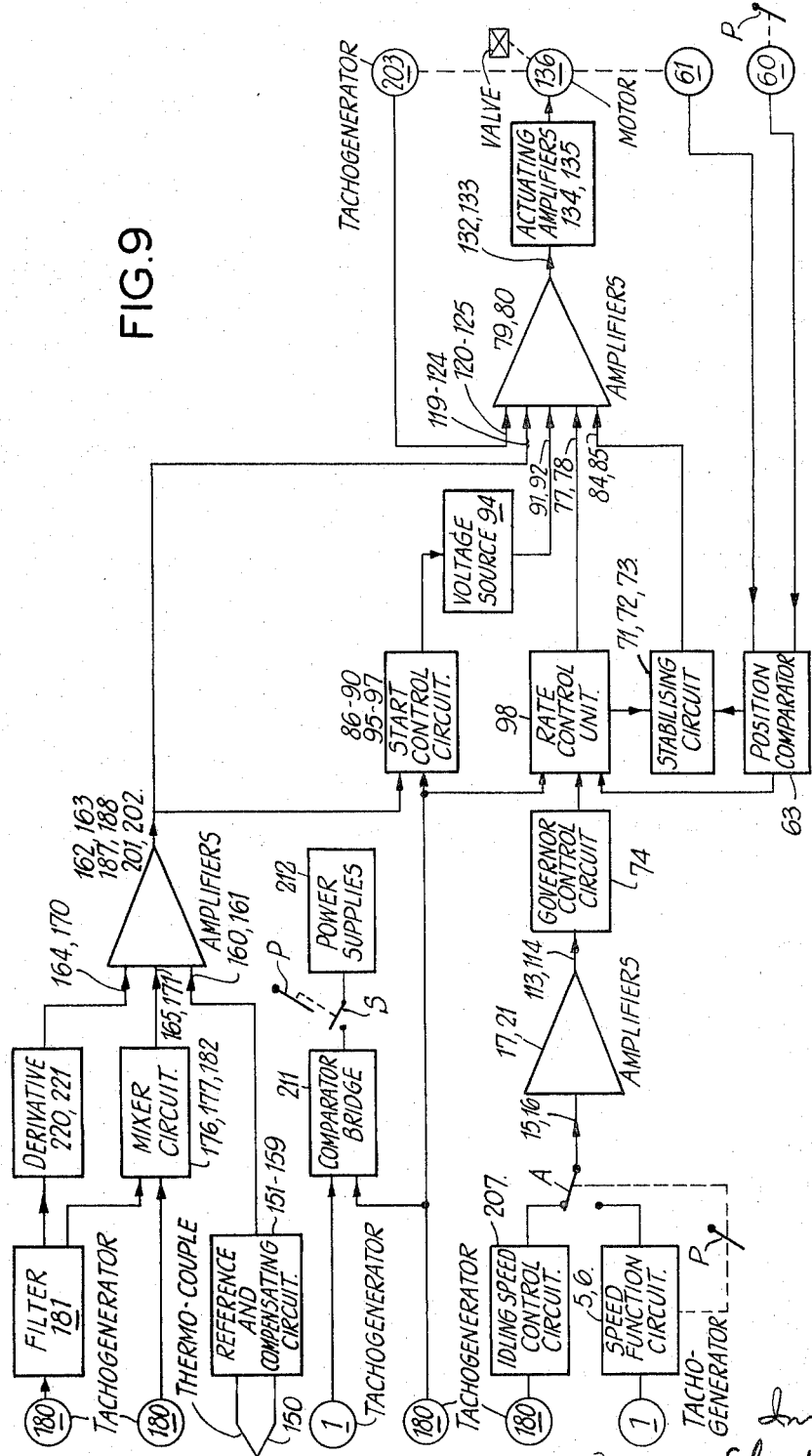

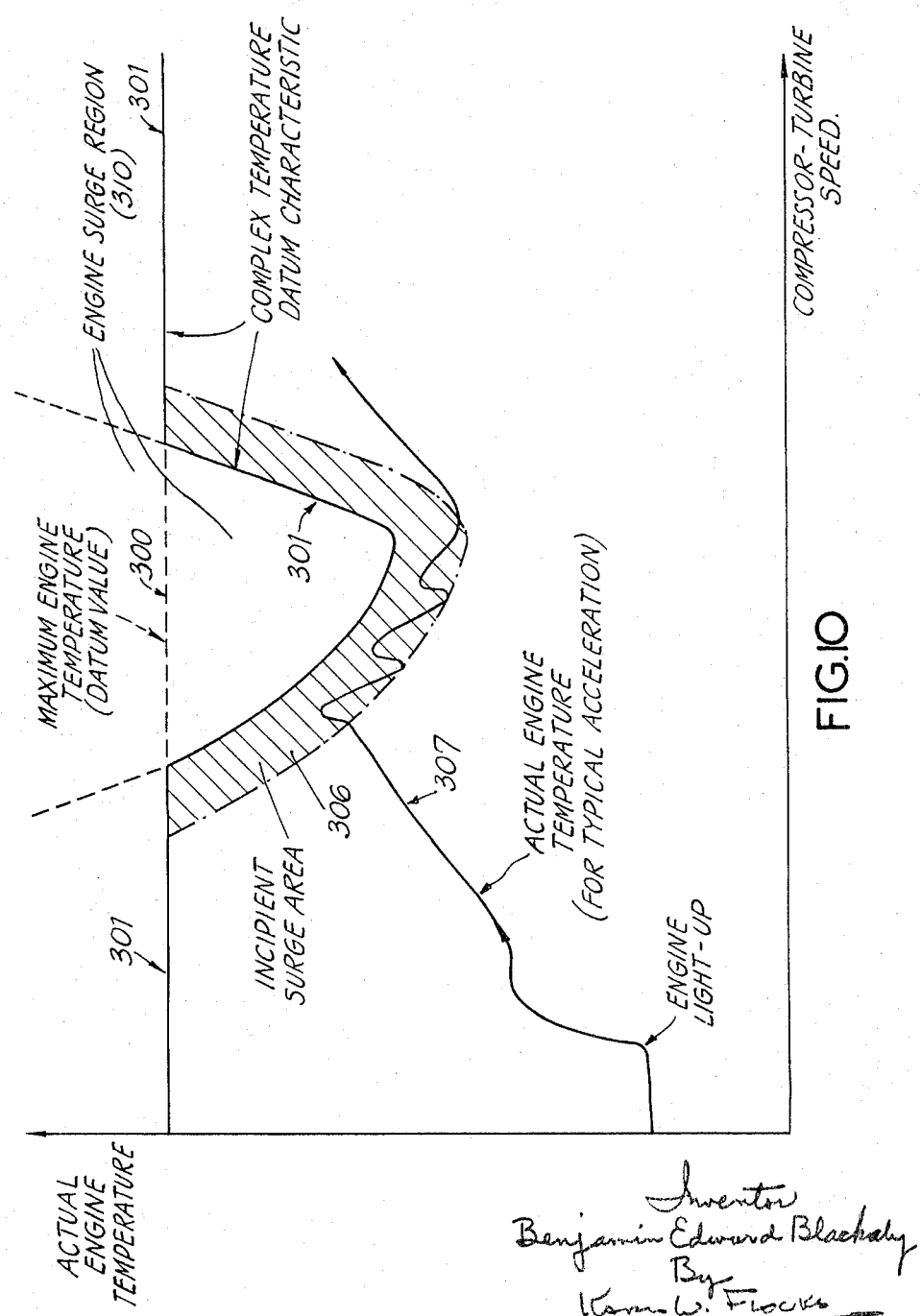

United States Patent Office 3,295,317
Patented Jan. 3, 1967

3,295,317
FUEL CONTROL SYSTEM FOR GAS
TURBINE ENGINES
Benjamin Edward Blackaby, Tewin Wood, England, assignor to Hawker Siddeley Dynamics Limited, Hatfield, England, a company of Great Britain
Filed Aug. 9, 1965, Ser. No. 478,101
Claims priority, application Great Britain, July 17, 1959, 24,718, 24,719, 24,720, 24,721
13 Claims. (Cl. 60—39.28)

The invention broadly stated provides an engine conapplication Serial No. 388,588, filed on August 10, 1964 and now abandoned, which earlier application was a division of my application Serial No. 42,585, filed on July 13, 1960, now Patent No. 3,151,450.

This invention relates to improvements in engine control systems particularly, but not exclusively, for gas turbine engines and is of application in the control of aircraft engines, e.g. for helicopters.

It is an object of the present invention to provide an improved engine control system whereby the engine speed shall be maintained substantially constant within predetermined limits at the speed for which it is set and shall respond rapidly to changes in the speed setting without surge.

The invention broadly stated provides an engine control system comprising means for controlling the magnitude and rate of change of the fuel supplied to the engine in accordance with the magnitude of a physical condition of the engine, engine speed, the speed setting of the engine and changes in the speed setting.

More specifically stated, the invention provides an engine control system for a gas turbine engine for an aircraft comprising means for controlling the magnitude and rate of change of the fuel supplied to the engine in accordance with the magnitude of the engine temperature, engine speed, the speed setting of the engine and changes in the setting in the sense to prevent the engine temperature exceeding a predetermined function of engine speed and thereby prevent surging of the engine.

Gas turbine engines normally require great care to be exercised when they are being started in order to avoid a false start and to avoid also what is known as a "wet" start where the engine is flooded with fuel before the engine conditions are suitable for ignition to occur and also to avoid surging. Normally the operator or pilot, in the case of gas turbine engines fitted to an aircraft, is required carefully to watch one or more dials each indicating the magnitude of a physical quantity, each representing a condition of the engine, e.g. engine speed and engine temperature, and to press the "ignition" button at the correct moment and carefully to control the fuel supply to the engine. Additionally, difficulties can arise if the need arises to start the engine of an aircraft when it is in flight.

It is a further object of the present invention to provide an improved engine control system which shall not be subject to the disadvantages referred to above.

Accordingly, an engine control system comprises means responsive to the position of a control member to produce an electric control signal for controlling the fuel supply to the engine and means responsive to the magnitude of at least one selected physical quantity representing an engine condition to produce an opposing electric signal in opposition to said electric control signal when the magnitude of each selected physical quantity is less than a predetermined value.

Preferably, the physical quantity responsive means is responsive to both engine speed and engine temperature.

Advantageously, the physical quantity responsive means includes a transistor arranged to be conducting when a power supply is switched on and each selected physical quantity is less than a predetermined value, and to be biased to the non-conducting condition when the magnitude of each such physical quantity exceeds its predetermined value.

Conveniently, means is provided for limiting the magnitude of said electric control signal when the latter exceeds a predetermined value in the sense to limit the rate of increase of the fuel supply to the engine.

More specifically, the invention provides an engine control system comprising means for controlling the fuel supply to the engine, means responsive to the angular displacement of a manual control member to produce an electric control signal applied to said fuel control means, a starting control circuit including a transistor, means for applying to said circuit a biasing electric signal the magnitude of which is a function both of engine speed and engine temperature, the arrangement being such that said transistor assumes the non-conducting condition when said engine speed and engine temperature exceed predetermined values, and means for applying a voltage source to said circuit to derive an opposing electric signal therefrom when said transistor is conducting, said opposing electric signal being utilised in opposition to said control signal to reduce or nullify the effect of the latter when the magnitude of the engine temperature and engine speed are less then predetermined values.

Preferably, a system according to any one of the five immediately preceding paragraphs includes means for modifying said electric control signal by an amount which is a predetermined function of engine speed and/or of the rate of change of engine speed.

The invention also includes a control system for a gas-turbine engine which includes a compressor turbine, the system comprising means for generating a first electric signal which represents a datum temperature which the actual engine temperature should not generally exceed, means for generating a second electric signal which represents the actual engine temperature, means responsive to compressor-turbine speed and to ambient temperature to generate a third electric signal which represents, at any given compressor-turbine speed and at any given ambient temperature, the amount by which the said datum temperature must be decreased in order to prevent the engine entering a surge region, means for subtracting the second and third electric signals from the first electric signal to derive a fourth electric signal which represents the difference between the actual engine temperature and the datum temperature when decreased by the said amount, a unidirectionally electrically conductive device supplied with the fourth electric signal and arranged to pass that signal only when it is of a polarity indicating that the actual engine temperature has exceeded the datum temperature when decreased by the said amount, control means responsive to the output of the unidirectionally conductive device to control the supply of fuel to the engine in the sense to tend to decrease that fuel supply, means responsive to the actual engine temperature to generate a fifth electric signal as a function of the rate of change of the actual engine temperature, and means for modifying the fourth electric signal as a function of the fifth electric signal such that, when the actual engine temperature does not exceed the datum temperature when modified by the said amount and when the rate of change of the function of the rate of change of the actual engine temperature exceeds a predetermined value, the polarity of the fourth electric signal will be changed such that the modified fourth electric signal will be passed by the unidirectionally conductive device.

Furthermore, the invention includes a control system for a gas-turbine engine which includes a compressor turbine, the system comprising means responsive to compressor-turbine speed and to ambient temperature for generating an electric signal which represents, for any given compressor-turbine speed and any given ambient temperature, a datum temperature which the engine temperature must not exceed if engine surge is to be prevented, means for deriving a temperature-difference signal representing the difference between said engine temperature and said datum temperature, whereby said temperature-difference signal would be of a predetermined polarity if said engine temperature exceeded said datum temperature, unidirectionally electrically conductive means arranged to pass said temperature-difference signal only when of said predetermined polarity, control means responsive to the output of said unidirectionally conductive means to tend to reduce the fuel flow to said engine, means for generating a modifying signal as a function of the rate of change of said engine temperature, said modifying signal being of said predetermined polarity when said engine temperature increases, and means for applying said modifying signal to said unidirectionally conductive device to pass said modifying signal to control means to tend to reduce said fuel flow.

One embodiment of the invention will now be described by way of example, reference being made to the accompanying drawings in which FIGURES 1 to 6 show separate parts of a circuit diagram of a control system for a gas turbine engine for a helicopter, FIGURE 7 shows diagrammatically the manner of interconnection of the six parts illustrated in FIGURES 1 to 6, FIGURE 8 is a schematic diagram of the control system, FIGURE 9 is a block schematic diagram of the circuits shown in FIGURES 1–6, and FIGURE 10 is an explanatory graph.

Figure 8:
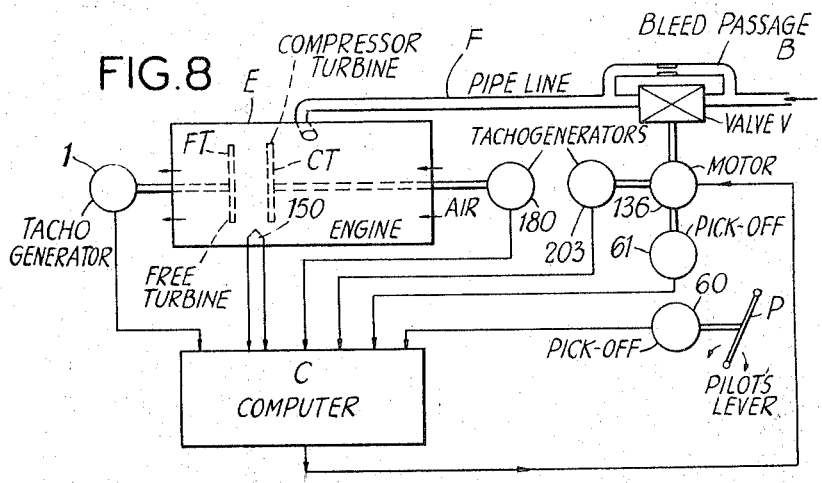
Figure 4:
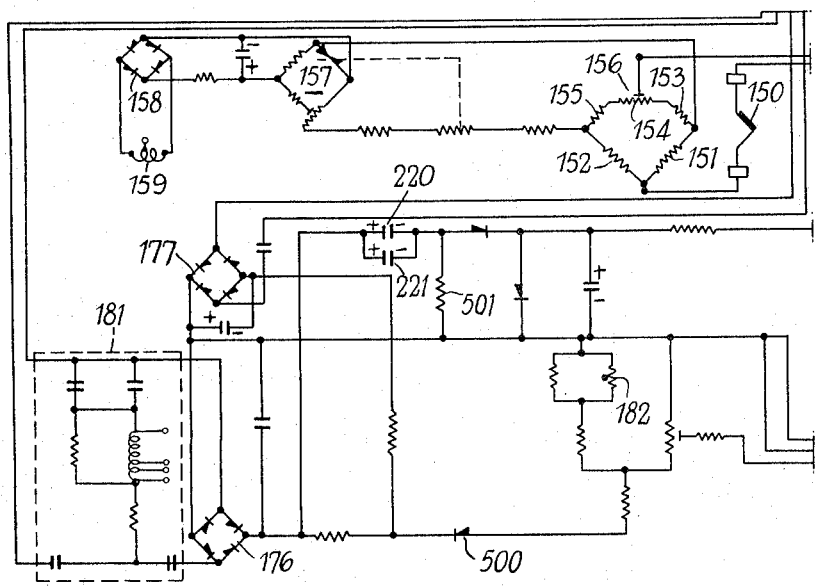
Figure 6:
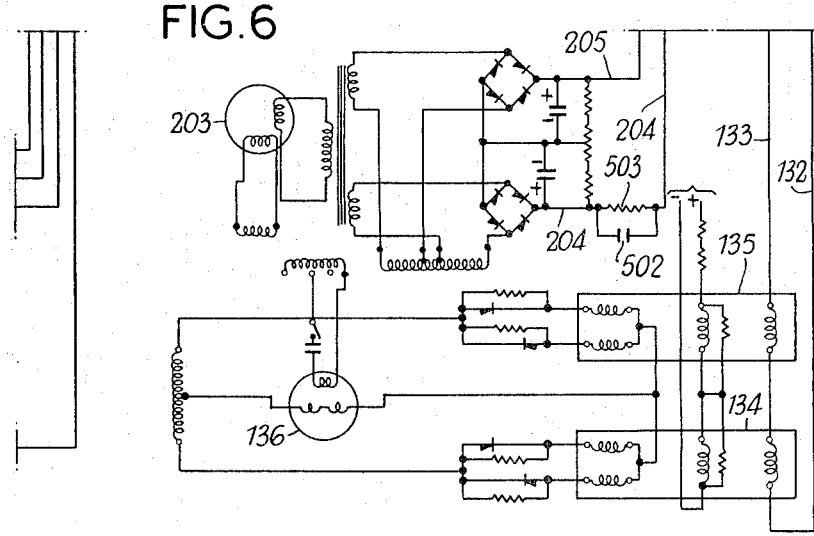

Referring first to FIGURE 8, a gas turbine engine E having a free turbine FT and a compressor turbine CT is supplied with fuel along a pipe-line F under the control of a valve V having a by-pass bleed passage B. The valve V is controlled by a two-phase actuator motor 136 which drives a tachogenerator 203 which supplies, to a computer C, an output signal which is a function of the rate of operation of the motor 136. The motor 136 is mechanically coupled to a rotary inductive pick-off 61 and a further similar pick-off 60 is mechanically coupled to the pilot's control lever P, the computer C deriving from the pick-offs 60 and 61 a signal which is a function of the relative angular displacements of the valve V and the pilot's control lever P. A thermocouple 150 is exposed to the inter-turbine temperature and supplies the computer C with a signal which is a function of such temperature. The free turbine FT drives a tachogenerator 1 which supplies the computer C with a signal which is a function of the free turbine speed and the compressor turbine CT drives a tachogenerator 180 which supplies the computer C with a signal which is a function of the compressor turbine speed. The computer C operates on the input signals thereto in a manner hereinafter described to produce an output signal which controls the motor 136 and hence the fuel supply to the engine E.

Referring now to FIGURE 1, the tachogenerator 1 is driven by the free turbine FT to produce an output signal having a frequency which is a function of the speed of rotation of the free turbine. This output signal is applied across the primary winding 2 of a transformer to provide a common input signal to two similar secondary windings 3 and 4 which are respectively connected in separate frequency responsive circuits 5 and 6. The circuit 5, in accordance with the present invention, includes two inductively coupled inductors 7 and 8 the mutual inductance of which depends upon the angular position of a rotor (not shown). The inductors 7 and 8 are connected in series with each other and with a pair of resistors 9 and 10 between one end of the secondary winding 3 and one end of a diagonal of a full-wave bridge rectifier 11, the other end of the secondary winding 3 being connected directly to the other end of the diagonal of the bridge rectifier 11. The inductors 7 and 8 are shunted by a resistor 12.

The secondary winding 4 of the frequency responsive circuit 6 is connected across one diagonal of a full-wave bridge rectifier 13 through a capacitor 14.

The output of the bridge rectifier 11 is a function of the frequency of the input signal to the circuit 5 and the output of the bridge rectifier 13 is a further function of the frequency of the input signal of the circuit 6. These two outputs are so connected as to provide a subtractive output which is applied through a switch A across the control windings 15 and 16 connected in series of two magnetic amplifiers 17 and 18 connected in push-pull (FIGURE 2).

It will be appreciated that the input signal applied across the control windings 15 and 16 is a function of the speed of rotation of the free turbine rotor and that this function may be varied by varying the angular displacement of the rotor controlling the mutual inductance of the inductors 7 and 8.

The inductors 7 and 8 may with advantage be the windings of a synchro or alternating current pick-off, one of the windings being fixed and the other winding being carried on the rotor for angular displacement relative to the fixed winding through 360°, the connections to the winding on the rotor being brought down through a hollow shaft on which the rotor is carried and being coiled to accommodate any twist imparted thereto by angular displacement of the rotor. Alternatively, the inductors 7 and 8 may be fixed and the rotor may carry one or more windings magnetically linking the fixed coils to control the mutual inductance therebetween by its angular position.

The two magnetic amplifiers 17 and 18 are the first pair of amplifiers of three series connected stages, the second of which comprises two similar magnetic amplifiers 19 and 20 also connected in push-pull and the third of which comprises a single magnetic amplifier 21 which operates as an output stage. The magnetic amplifier 17 has four control windings 15, 22, 23 and 24, a bias winding 25, a feed-back winding 26 and A.C. input windings 27 connected through rectifiers 28 across a centre-tapped power supply winding 29 from which the A.C. power is derived. The magnetic amplifier 18 similarly has four control windings 16, 30, 31 and 32, a bias winding 33, a feed-back winding 34 and A.C. input windings 35 connected through rectifiers 36 across the secondary winding 29. The windings 15, 22, 23, 24, 25 and 26 of the amplifier 17 are connected in series with the corresponding windings 16, 30, 31, 32, 33 and 34 of the amplifier 18.

The magnetic amplifier 19 has a control winding 37, a bias winding 38, a feed-back winding 39 and A.C. input windings 40 connected through rectifiers 41 across a centre-tapped power supply winding 42 from which the A.C. power is derived.

The magnetic amplifier 20 has a control winding 43, a bias winding 44, a feed-back winding 45 and A.C. input windings 46 connected through rectifiers 47 across the secondary winding 42. The windings 37, 38 and 39 of the amplifier 19 are connected in series with the corresponding windings 43, 44 and 45 of the amplifier 20.

The output of the amplifier 19 and 20 is derived across resistors 48 and 49 and a gain-limiting negative feed-back connection for the first two stages is provided through a resistor 50 from across the resistors 48 and 49 to the windings 24 and 32 of the amplifiers 17 and 18 respectively. A further feed-back connection is applied across the windings 23 and 31 through resistor 51 and 52 and capacitor 53, the connection providing derivative positive feed-back and a still further feed-back connection providing derivative negative feed-back is applied across the windings 22 and 30 through resistors 54 and 55, and capacitor 56. Capacitors 57 and 58 are connected in parallel with capacitor 56 and a rectifier 59 is also connected in parallel therewith. The output of the magnetic amplifiers 17 and 18 is applied across the control windings 37 and 43 of the amplifiers 19 and 20 and the output of the latter is applied across the control winding of the magnetic amplifier 21. The values of the resistors 51, 52, 54 and 55 and the values of the capacitors 53, 56, 57 and 58 are selected to be such that over one range of rate of change of input signal to the amplifiers 17 and 18 the positive derivative feed-back connection is operative to cause the rate of change of the output of the amplifiers 19 and 20 to lead that of the input signal and over another range of rate of change of input signal the negative derivative feed-back connection is operative to cause the rate of change of the output of the amplifiers 19 and 20 to lag behind that of the input signal. Thus by way of specific example, the resistors 51 and 54 have a value of 2.7K ohms, the resistors 52 and 55 have a value of 4.7K ohms and the capacitors 53, 56, 57 and 58 have a value of 50µf. With those values, the rate of change of the output of the amplifiers 19 and 20 leads that of the input signal to the amplifiers 17 and 18 when the rate of change of the input signal corresponds to a rate of change of 0–1 c.p.s., lags that of the input signal when the rate of change of the latter corresponds to a rate of change of 1–1.5 c.p.s., leads that of the input signal when the rate of change of the latter corresponds to a rate of change of 1.5–1.8 c.p.s. and lags that of the input signal when the rate of change of the latter corresponds to a rate of change of 1.8 c.p.s.–4 c.p.s. An input signal having a rate of change above 4 c.p.s. will give negligible change in output of the amplifier 21 due to the negative feedback which, owing to the chosen value of the capacitors and resistors, reduces the gain of the amplifiers 17, 18, 19 and 20 at such input signal variation rate.

When the free turbine rotor has a steady speed of rotation, the input signal to the magnetic amplifiers 17 and 18 will be steady and the output of the amplifier 21, which controls the fuel supply to the engine, will also be steady. When this speed of rotation for which the engine is set increases or decreases, the input signal will rise at a rate which, if corresponding to a rate of change of 0–1 c.p.s. or 1.5–1.8 c.p.s., produces a rate of rise in the output of the amplifier 21 which leads that of the input signal and in effect anticipates change in the latter and reduces or increases the fuel supply to the engine to bring the latter back to its steady speed. If, however, the engine speed increases or decreases at a rate corresponding to a rate of change of 1–1.5 c.p.s. or 1.8–4 c.p.s. the rate of change of output of the amplifier 21 lags behind that of the input signal but still reduces or increases the fuel supply to the engine in the sense to bring the latter back to its steady speed. As explained above, the magnetic amplifiers 17, 18, 19 and 20 will not accept a rate of change of input signal corresponding to a rate of change greater than 4 c.p.s., so that if the input signal varies at a rate greater than 4 c.p.s., e.g. due to transients in the circuits, the output of the amplifier 21 is steady and the fuel supply to the engine remains at its previously set level and engine surge is prevented. Furthermore if the magnitude of the change in the input signal is greater than a predetermined magnitude due, for example, to the aircraft being buffeted by wind or, in the case of a helicopter, due to the driven blade becoming disengaged from the drive, the rectifier 59 operates effectively to cut-out the negative derivative feed-back and hence the lag in the system so that under these conditions the system has a fast response to handle such changes.

The rotary inductive pick-off 60 (FIGURE 3) is mechanically coupled to the pilot's control lever so as to follow displacement of the latter and is electrically coupled to a further rotary inductive pick-off 61. The pick-off 61 is mechanically coupled to the output shaft of the two-phase actuator motor 136 (FIGURES 6 and 8) controlling the operation of the fuel throttle valve V (FIGURE 8) of the engine so as to follow the latter and is also electrically connected to a power supply winding 62 so as to produce across the primary winding 63 of a transformer 64 an electric control signal, the magnitude and relative phase of which is a function of the relative angular displacement between the pick-offs 60 and 61 and hence of the relative angular displacements of the pilot's control lever P and the engine throttle valve V. The transformer 64 has two secondary windings 65 and 66 respectively connected to power supply windings 67 and 68 and also respectively connected to full-wave bridge-rectifier circuits 69 and 70. One end of a resistor 71 is connected to the bridge-rectifier circuit 69 and the resistor 71 is connected in series with a rectifier 72 in the collector circuit of a transistor 73 the emitter electrode of which is connected to the bridge-rectifier circuit 70. The transistor 73 is arranged to be normally conducting during start up and below a predetermined engine speed, e.g. 9,000 r.p.m. and the rectifier 72 is provided to allow current to flow only during opening movement of the throttle, by advance of the pilot's control lever P, to give a voltage across the resistor 71. The one end of the resistor 71 is connected through a governor control circuit 74, which will be described in greater detail hereafter, and thereafter through resistors 75 and 76 to the two control windings 77 and 78 connected in series of two magnetic amplifiers 79 and 80, the magnetic amplifiers being connected in push-pull. The voltage developed across the resistor 71 is applied through capacitors 81 and 82 and resistor 83 across the control windings 84 and 85 connected in series of the magnetic amplifiers 79 and 80. The output of the magnetic amplifiers 79 and 80 controls the actuator motor 136, as described below.

A starting control circuit is provided comprising a full-wave bridge rectifier 86 (FIGURE 3) across one diagonal of which is connected a secondary winding 100 (FIGURE 1) which derives a signal from the tachogenerator 180 driven by the compressor turbine CT, the amplitude and the frequency of the electric signal so produced being a function of the compressor-turbine speed. The output of the bridge rectifier 86 is applied across a capacitor 87 and through a rectifier 87a a resistor 88 and a rectifier 89 to the base electrode of a transistor 90, the collector electrode of which is connected to one side of control windings 91 and 92, connected in series, of the magnetic amplifiers 79 and 80. The emitter electrode of the transistor 90 is connected through a resistor 93 to the other side of the series-connected windings 91 and 92 and a rectified voltage is applied across the resistor 93 from a suitable voltage source 94 including a power supply winding. The base electrode of the transistor 90 is connected to the emitter electrode thereof through a resistor 95 and the emitter electrode is connected to the junction of the resistor 88 and rectifier 89 through resistors 96 and 97, the resistor 96 having applied thereacross along lines 215 and 130 an electric signal the magnitude of which is a function of engine temperature, as described below. This function need not necessarily be a linear function and desirably is non-linear over at least a part of its characteristic.
u°rr1iseleaoishrdluorfwoh The emitter electrodes of the transistor 73 and 90 are directly connected to each other and between these emitter electrodes and the junction of the resistors 75 and 76 is connected a rate control unit 98 which is arranged to provide one limit for the output signal to the windings 77 and 78 at low compressor speeds, e.g. speeds below 9,000 r.p.m., and a second higher limit above such speeds. This control unit 98 comprises a full-wave bridge rectifier 99 having connected across one diagonal thereof the secondary winding 100 (FIGURE 1) which derives a signal from the tachogenerator 180 driven by the compressor turbine and which has a magnitude and frequency which is a function of the compressor turbine speed. Connected across the other diagonal of the rectifier bridge 99 is a capacitor 101 and also two resistors 102 and 103 in series. The base electrode of the transistor 73 is connected to the junction of the resistors 102 and 103 through a rectifier 104 and to the base electrode of a further transistor 105, the base electrode of the latter being connected to its emitter electrode, and also to the emitter electrodes of the transistors 73 and 90, through a resistor 106.

The emitter electrode of the transistor 105 is also connected to the junction of the resistors 75 and 76 through a rectifier 107, and the collector electrode thereof is connected to the junction of the resistors 75 and 76 through a resistor 108 and rectifier 109.

The governor control circuit 74 comprises three resistors 110, 111 and 112 connected in series, an input signal to the governor circuit being applied along lines 113 and 114, across resistors 110 and 111 and derived from the output of the magnetic amplifier 21 which output signal is a function of the engine speed. A feed-back connection to the magnetic amplifier 21 is taken along a line 115. A capacitor 116 is connected in parallel with the resistors 110, 111 and 112, and also connected across these resistors and in parallel therewith is a further resistor 117 in series with a rectifier 118, rectified power being applied across the resistor 117 from a suitable power source including a power supply winding as indicated.

The magnetic amplifier 79, has, in addition to control windings 77, 84 and 91, a control winding 119, a further control winding 120, a bias winding 121, a feed-back winding 122 and A.C. windings 123. The magnetic amplifier 80 similarly has, in addition to control windings 78, 85 and 92, a control winding 124, a further control winding 125, a bias winding 126, a feed-back winding 127 and A.C. windings 128. The control windings 119 and 124 are connected in series and are supplied with an input signal along lines 129 and 130, which signal is derived as a function of engine temperature. The bias windings 121 and 126 are connected in series as are the feed-back windings 122 and 127. The A.C. windings 123 and 128 are supplied with power from a power supply winding 131, and the output from the amplifiers 79 and 80 is supplied along lines 132 and 133 to a further pair of magnetic amplifiers 134 and 135 (FIGURE 6) connected in push-pull the output of which is utilised to control the two-phase actuator motor 136. The windings 120 and 125 are connected in series and are supplied with a signal derived from the tachogenerator 203 driven by the motor 136 as a function of the rate of operation of such motor.

The thermo-couple 150 (FIGURE 4) is arranged between the turbines FT and CT to measure the engine inter-turbine gas temperature and is connected to one end of the junction of a copper resistor 151 and a resistor 152 of eureka wire forming part of a bridge network embodying further resistors 153, 154 and 155, the resistor 154 being tapped by means of a slider 156. Across one diagonal of this resistance bridge is connected one diagonal of a further resistance bridge 157, the other diagonal of which is connected across a full-wave rectifier bridge 158 supplied with power from a power supply winding 159.

The resistance bridge 151, 152, 153, 154 and 155 operates to produce a constant output signal indicated by the straight line 300 (FIG. 10) and representing a maximum engine temperature datum value. Thus the arrangement functions to produce an output signal between the slider 156 and the other end of the thermo-couple whose magnitude and direction is determined by the difference between engine temperature and the maximum engine temperature datum value set by the position of the slider 156. This output signal is applied across two control windings 160 and 161 connected in series of a pair of parallel connected magnetic amplifiers 162 and 163 (FIG. 5).

The magnetic amplifier 162 has further control windings 164, and 165, a positive derivative feed-back winding 166, a bias winding 167, a negative feed-back winding 168 and A.C. windings 169. The magnetic amplifier 163 has similarly control windings 170 and 171, a positive derivative feed-back winding 172, a bias winding 173, a negative feed-back winding 174 and A.C. windings 175.

The A.C. windings are energized from a centre-tapped power supply winding.

The feed-back windings 166 and 172 are connected in series with each other and with a capacitor 302 and resistor 303 across the output of the amplifiers 162 and 163, the capacitor 302 and resistor 303 operating to provide the derivative term.

The windings 164 and 170 are connected in series, as are the windings 165 and 171, and derive signals from a circuit which comprises full-wave bridge rectifiers 176 and 177 each of which has a diagonal connected across separate windings 178 and 179 respectively (FIGURE 1). The windings 178 and 179 derive signals the frequencies of which are functions of the compressor-turbine speed from the tachogenerator 180 driven by the compressor turbine of the engine. A filter network 181 (FIGURE 4) is connected across the winding 178 to modify the signal produced by the latter in a predetermined manner. The signal from the winding 179 is rectified in the bridge rectifier 177 and mixed with the signal from the winding 178 in a mixer circuit incorporating a thermistor 182 which modifies the mixed signal in accordance with ambient temperature. The output from this circuit is supplied across the input windings 165 and 171.

The circuit 181 is a high-pass filter so that the output signal from the winding 178, whose voltage would otherwise be a linear function of the frequency of compressor turbine speed, has its voltage altered to be a non-linear function. With increasing speed, the voltage rises at first and then falls, after which it rises again. The voltage of the output signal from the winding 179 after rectification is a linear function of the speed. The mixer circuit has the effect of subtracting the linear from the non-linear function and the difference signal is passed through a rectifier 500 which suppresses the positive component. This leaves a signal which, after a first constant level, dips and then returns to the constant level. This is fed to the control windings 165 and 171.

The effect of the signals to the windings 165, 171 and 160, 161 is to produce the complex datum characteristic 301 (FIGURE 10) in the sense that the maximum engine temperature datum 300 (derived from the bridge network 151–156) is modified with engine speed to include the limits of the engine surge region 310 (FIGURE 10). Thus, if the engine temperature sensed by the thermo-couple 150 were to exceed the datum value defined by the characteristic 301 there would be an output from the amplifiers 162 and 163 of one polarity and whilst it is below that datum value there is an output of the opposite polarity.

The acceptable engine temperature defined by the characteristic 301 is not a constant tetmperature but varies with compressor turbine speed and ambient temperature in the sense to always prevent the engine from entering the surge region 310.

Thus for low compressor speeds, the value of the characteristic 301 is constant (FIGURE 10); as higher compressor turbine speeds are reached, at which a danger of surge arises, the value of the characteristic 301 decreases. For still higher compressor-turbine speeds, the value of the characteristic 301 increases and eventually returns to its previous constant value (FIGURE 10).

As the engine temperature, sensed by the thermo-couple 150, approaches the datum value set by characteristic 301 it enters a so-called incipient-surge area indicated by the shaded area 306 (FIGURE 10) in which the actual engine temperature rises very rapidly in relation to its normal rate of increase outside of and below the incipient-surge area 306.

Not only does the engine temperature rise rapidly in this area 306, but, as can be seen from FIG. 10, the temperature error representing the difference between the datum characteristic 301 and the actual engine temperature represented by curve 307 (FIG. 10) changes very rapidly. This results in a large positive derivative feedback signal appearing in the windings 166 and 172 of the amplifiers 162 and 163 and in the output of these amplifiers and hence in the signal applied along lines 130 and 215. Under normal conditions with the engine temperature below the datum value there would be an under-temperature signal across lines 130 and 215 tending to bias the rectifier 214 off. However under the conditions referred to above, the derivative signal is arranged to be of such a magnitude and polarity as to oppose and over-ride the under-temperature signal and hence render the rectifier 214 conducting. The resulting signal is applied to the amplifiers 79 and 80 and operates to reduce the rate of opening of, or to close, the throttle V.

It will be appreciated that the response delay inherent in the thermo-couple 150 and the consequent lag is overcome by the provision of the positive derivative feeding signal described above which ensures that the engine temperature never attains a value defined by the datum characteristic 301 in the surge region.

The two capacitors 220 and 221 in parallel, together with the resistor 501, acts as a differentiating circuit for the non-linear function output signal and give a positive derivative which is fed to the control windings 164 and 170. This is only effective on acceleration above a certain speed, that is beyond the dip in the characteristic 301 (FIGURE 10).

Thus, if the compressor-turbine acceleration exceeds a certain low value, the straight portion of the characteristic 301 is temporarily lifted, so as to permit a higher engine temperature beyond the dip in the characteristic 301.

The output from the aplifiers 162, 163 along lines 183 and 184 is thus a predetermined function of the difference between the engine temperature and a datum temperature and a function also of the compressor turbine speed and ambient temperature, these functions being controlled in a predetermined manner, and it is further a function of the rate of change of compressor turbine speed. The output along the lines 183 and 184 is applied across series connected control windings 185 and 186 of parallel connected magnetic amplifiers 187 and 188 which also respectively embody positive derivative feed-back windings 189 and 190 (with capacitor 304 and resistor 305), bias windings 191 and 192, negative feed-back windings 193 and 194 and A.C. windings 195 and 196. The A.C. windings are energised from a centre-tapper power supply winding. The output from the amplifiers 187 and 188 is taken along lines 197 and 198 and is supplied across series connected control windings 199 and 200 of parallel-connected magnetic amplifiers 201 and 202 which act as a buffer stage and which supply an output along the lines 215 and 130 referred to above. The line 215 is connected to the line 129 through a rectifier 214 so as to pass to the control windings 119 and 124 only an output signal across lines 215 and 130 of a selected polarity.

To clarify the purpose of the rectifier 214 and the nature of the invention, an example of the operation of the control circuit will now be described. Suppose that the bridge circuit 151–156 has been set to define the maximum engine temperature datum represented by the straight line 300 (FIGURE 10). The straight line 300 is converted, by causing it to dip (as shown in FIGURE 10), into the characteristic 301 of which the dip defines the lower limits of a surge region 310 which the engine must not enter. The dip portion of the characteristic 301 is not of a constant shape, but varies in shape, in a predetermined manner calculated to continue to define the lower limits of the surge region 310 which region changes as a function of compressor-turbine speed and of ambient temperature.

Suppose now that the actual engine temperature is constant and is, at a given compressor-turbine speed and at a given ambient temperature, 50° C. below the relevant characteristic 301 (FIGURE 10). Under these conditions, the effect of the amplifiers 162 and 163 is to generate a constant error signal which represents the distance between the relevant point on the engine-temperature curve 307 (FIGURE 10) and the relevant point upon the characteristic 301 (FIGURE 10). This constant error signal will be of a positive polarity and will appear, after amplification, at the output of the amplifiers 201 and 202 where it might typically have a magnitude of +1.0 volt. The positive polarity of the error signal indicates that the engine is operating below the characteristic 301 and, consequently, no corrective action is required; the rectifier 214 thus acts to prevent such signals passing to the subsequent mixer amplifiers 79 and 80 and to prevent any resultant adjustment of the throttle valve V.

Suppose, however, the actual engine temperature is, at a given compressor-turbine speed and a given ambient temperature, 50° C. below the relevant characteristic 301 and is rising rapidly (as it will if the engine enters the incipient-surge area 306, FIGURE 10) at, say, 100° C. per second. Under these conditions, the output of the amplifiers 201 and 202 will be the algebraic sum of two components: the first of these components will be the positive error signal mentioned above, having the same typical magnitude of +1.0 volt; the second component will be derived from the derivative action introduced by the amplifiers 162, 163, 187 and 188, and will be of the relatively opposite polarity and will typically have a magnitude of −2.0 volts. The resultant error signal from the amplifiers 201 and 202 will thus have a typical magnitude of −1.0 volt and will be of such a polarity that the rectifier 214 will allow the signal to pass to the mixer amplifiers 79 and 80; this resultant error signal will thus act to tend to reduce the rate of opening of the throttle valve V or to tend to close the throttle valve V.

The tachogenerator 203 provides an output signal the magnitude of which is proportional to the rate of operation of the actuator motor 136 from which signal is derived an output signal along lines 204 and 205 which is applied across the series-connected control windings 120 and 125 of the amplifiers 79 and 80 and the magnitude of which is proportional to the rate of operation of the actuator motor 136 plus the derivative thereof, the necessary differentiating circuit including the capacitor 502 and the parallel resistor 503. The final output signal along the lines 132 and 133 is amplified in the amplifiers 134 and 135 and controls the actuator motor 136 in the sense to control the fuel supplied to the engine so as to prevent engine surge.

The tachogenerator 180 (FIGURE 1) also provides a signal through a winding 206 to a circuit indicated generally at 207 which selects the idling speed of the engine and which is adapted to be connected across the control windings 15 and 16 through the switch A. Furthermore, a signal from the tachogenerator 1 is taken from the windings 208 and rectified by a fullwave rectifier bridge 506, and a signal from the tachogenerator 180 is taken from the winding 100 and rectified by the full-wave rectifier bridge 86, these two signals being applied to a power-supply control circuit which includes a full-wave rectifier bridge 211, the output of which is arranged to switch off the power supplies provided by a suitable circuit 212 if either tachogenerator fails. The circuit 212 includes a transformer having all the secondary power supply windings and a 12 volt bias supply.

To facilitate the understanding of the operation of the circuits illustrated in FIGURES 1 to 6 reference will first be made to FIGURE 9 in which these circuits are shown schematically and in which like references are used to denote like parts. It will be observed that the valve-controlling motor 136 is under the control of the magnetic amplifiers 79 and 80 which have five inputs and the output from which controls the motor 136 through the actuating amplifiers 134 and 135. The first input to the amplifiers 79, 80 is a temperature signal derived from the magnetic amplifiers 162, 163, 187, 188, 201 and 202 and is a function of compressor turbine speed and the rate of change thereof, engine temperature, ambient temperature and the rate of change of engine temperature as will be described more fully hereafter. The second input to the amplifiers 79, 80 is a biasing signal derived from the start control circuit 86–90, 95–97 which signal on starting up the engine opposes the third input which is a rate control signal derived from the rate control unit 98. The fourth input is a stabilising signal which is only effective up to 9,000 r.p.m. and is derived from a stabilising circuit composed of the resistor 71, diode 72 and transistor 73. The fifth input to the amplifiers 79 and 80 is a feed-back signal derived from the tachogenerator 203 as a function of the rate of operation of the motor 136 and of the derivative thereof.

The signal from the tachogenerator 180 representing compressor speed is supplied to the filter 181 to derive a signal which is a non-linear function of the compressor speed and which, through the capacitors 220 and 221 and the resistor 501, provides a derivative of this non-linear function to the magnetic amplifiers 162, 163, 187, 188, 201 and 202. This non-linear function of compressor speed is also supplied to the mixer circuit which includes the bridge rectifiers 176 and 177 and incorporates the thermistor 182. Also supplied to this mixer circuit is a signal representing compressor speed derived from the tachogenerator 180 so that the output of the mixer circuit to the amplifiers 162, 163, 187, 188, 201 and 202 is the difference between the non-linear function and linear function of compressor speed and is also a function of the ambient temperature. The thermocouple 150 which measures engine temperature, together with compensating circuit 151–159, produces a signal which represents the difference between actual engine temperature and the datum determined by the characteristic 300 which signal is supplied to the magnetic amplifiers 162, 163, 187, 188, 201 and 202 so that the output from the latter is the temperature signal which is a function of compressor speed and the rate of change thereof, engine temperature, ambient temperature and the rate of change of engine temperature. This temperature signal is also fed to the start control circuit 86–90, 95–97 together with a signal representing compressor speed derived from the tachogenerator 180 to derive through the voltage source 94 the biasing signal to the mixer amplifiers 79, 80.

The switch A is arranged to be controlled by the pilot's lever P to connect the idling speed control circuit 207 to the amplifiers 17 and 21 when the pilot's lever P is displaced over the range 0–20° and to connect the speed function circuits 5 to 6 to the amplifiers 17 to 21 when the pilot's lever is displaced beyond 20°. The idling speed selector circuit 207 selects the idling speed as a function of compressor speed. The speed function circuits 5 and 6 select the engine speed as a function of the free turbine speed and this function is varied by displacement of the pilot's lever P by displacement between 60–120° by causing such displacement to vary the mutual inductance of the inductors 7 and 8. The output from the amplifiers 17 to 21 passes through the governor control circuit 74 which is only effective at speeds above 14,000 r.p.m. to provide an input signal to the rate control unit 98 which also has a second input as a function of compressor speed and a third input deriving from the position comparator 63 which is a function of the difference between the angular displacements of the pick-offs 40 and 61. The rate control unit 98 provides the rate control signal to the mixer amplifiers 79, 80 and limits the rate of opening of the valve V to one level up to 9,000 r.p.m. and to a higher level at engine speeds above this value. The position comparator 63 also supplies a comparison signal to the stabilizing unit 71, 72, 73 which is controlled by the rate control unit 98 so as to be inoperative above 9,000 r.p.m. but to provide below this speed a stabilizing signal to the mixer amplifiers 79, 80.

There is also provided a safety circuit comprising the comparator bridge 211 supplied with inputs representing respectively compressor speed and free turbine speed and connected through a switch S to the power supplies 212, which switch S is arranged to be closed by the pilot's lever P when displaced between 20–120° so that any failure of either tachogenerator 1 and 180 sensed by the comparator bridge 211 operates automatically to switch-off the power supplies.

In order to start the engine the pilot's lever P is displaced from 0–20° and the power is switched on. The opposing (biassing) signal from the start control circuit 86–90, 95–97 opposes the rate control signal from the rate control unit 98 and the valve V remains closed allowing only a small quantity of fuel to reach the engine through the bleed passage B. The switch A is connected to the idling circuit 207. The pilot starts the engine and the engine speed and engine temperature rise until a correlated value is attained when the start control circuit 86–90, 95–97 ceases to function and the biassing signal is removed with the result that the rate control signal now becomes operative limiting the opening rate of the valve V to one value below 9,000 r.p.m. and to a higher value above this speed. When the engine speed attains 9,000 r.p.m. the stabilizing signal derived from the stabilizing unit 71, 72, 73 as a function of the difference between the positions of the pick-offs 60 and 61 ceases. The engine now achieves its ground idling speed and so far is under the over-riding control of the temperature signal.

The pilot then moves the lever P from 20° to 60° which is the minimum flight position, thereby connecting the switch A to the speed function circuits 5 and 6 and closing the switch S to set the safety circuit. As the engine speed rises above 14,000 r.p.m. the governor control circuit becomes operative, and it will be seen that the motor 136 is under the control of signals representing the temperature signal, the free turbine speed and the position error between the pick-offs 60 and 61. For flight conditions the pilot's lever P is displaced between 60° and 120° varying the mutual inductance of the inductors 7 and 8 so that the rate control signal to the mixer amplifiers 79, 80 is a function of the free turbine speed, which function is variable as a function of the position of the pilot's lever P, is a function of the compressor speed and is also a function of the position error of the pick-offs 60 and 61 so that the rate of opening of the valve V and hence the engine acceleration is controlled to maintain the engine temperature below the datum 301.

It will be appreciated from the above that the arrangement described avoids surging of the engine and also avoids a "wet" start.

The operation of the circuit illustrated in FIGURES 1 to 6 will now be described in greater detail with reference to these figures. When the engine is to be started, the switch A connects the circuit 207 across the windings 15 and 16. The pilot switches on the power and moves his control lever P from the neutral position to the idle position, e.g. through an angle of 20°, thus producing a relative angular displacement between the rotary inductive pick-offs 60 and 61. This produces a control signal which is applied across the control windings 77 and 78. The transistor 90 is conducting and a biasing signal is supplied from the starting control circuit across the windings 91 and 92 in opposition to the control signals applied across the windings 77 and 78, so that the output from the magnetic amplifiers 79 and 80 is such as to cause the actuating motor 136 to close the throttle valve V. A limited amount of fuel is admitted to the engine E from the by-pass bleed passage B of the throttle valve in an amount sufficient to allow ignition to take place. The pilot presses the ignition button and ignition occurs and the engine starts. The engine speed increases and the engine temperature increases, so that the transistor 90 is biased to cut-off when the engine speed and engine temperature reach appropriate correlated values. When this occurs, the biasing signal from the started control circuit applied across the windings 91 and 92 is cut-off and the signals applied across the windings 77 and 78 become effective so that the engine is now under the control of the pilot's control lever P. The throttle valve begins to open and a stabilising signal is applied across the windings 84 and 85. The control signal applied across the windings 77 and 78 is modified by the rate control unit 98.

At speeds below a predetermined speed, e.g. 9,000 r.p.m. the transistor 105 is conducting and the control signal applied across the winding 77 and 78 is limited by the rectifier 109 which is conductive below a predetermined level of signal. Above the predetermined engine speed, e.g. 9,000 r.p.m., the transistor 105 is non-conductive and the control signal applied across the winding 77 and 78 is limited by the rectifier 107. This is conductive at a higher level of signal. In this way the rate of opening of the throttle valve is limited to a slow rate up to a predetermined engine speed of 9,000 r.p.m. and thereabove the rate of opening of the throttle valve is limited to a higher rate. No such limit is imposed on the rate of closing of the throttle valve.

The stabilising signal across the windings 84 and 85 is derived from the voltage developed across the resistor 71 and is rendered ineffective upon the transistor 73 becoming non-conductive at the predetermined engine speed of 9,000 r.p.m.

The control signal applied across the winding 77 and 78 is not modified by the governor signal derived from the governor circuit 74 until the engine speed has risen above a higher predetermined value, e.g. 14,000 r.p.m.—the idling speed.

Throughout this operation it will be understood that the opening of the throttle valve by the actuator motor 136 remains under the over-riding control of any signal passed by the rectifier 214 and applied along the lines 129 and 130 to the control winding 119 and 124, which signal is required by the polarity of the rectifier 214 to have a polarity such that it will tend to reduce the rate of opening or tend to close the throttle valve V.

Further movement of the pilot's control lever P to produce a displacement greater than 20° causes the switch A to move to connect the input windings 15 and 16 across the circuits 5 and 6. At the same time the output from the bridge 211 is connected to the circuit 212, by means of a switch B similarly operated to the switch A, to set the safety circuit. The movement of the pilot's lever P between 20° and 60° produces a transition from ground idling to governing at 85% of maximum free turbine speed, the output from the amplifier 21 modifying the controlling signal applied across the control windings 77 and 78 in the manner described above. Further movement of the pilot's control lever P between 60° and 120° selects a corresponding engine speed between 85% and 100% of maximum free turbine speed and varies the mutual inductance of the inductors 7 and 8, by movement of the rotor mentioned above, to produce a corresponding controlling signal.

The movement of the pilot's control lever P in the sense to increase engine speed causes the actuator motor 136 to open the fuel throttle at a limited maximum rate.

In a modification of the invention, the differentiating circuit consisting of the capacitor 302 and the resistor 303 (FIGURE 5) is omitted and is replaced by a differentiating circuit arranged between, on the one hand, the slider 156 and the thermocouple 150 (FIGURE 4) and, on the other hand, the magnetic-amplifier windings 160 and 161 (FIGURE 5). In this case, the signal delivered to the windings 160 and 161 contains a first component which is proportional to the difference between the datum temperature (set by the slider 156) and the engine inter-turbine temperature, and a second component which is proportional to the derivative of the first component.

I claim:

1. A control system for a gas-turbine engine which includes a compressor-turbine, the system comprising means for generating a first electric signal which represents a datum temperature which the actual engine temperature should not generally exceed, means for generating a second electric signal which represents the actual engine temperature, means responsive to compressor-turbine speed and to ambient temperature to generate a third electric signal which represents, at any given compressor-turbine speed and at any given ambient temperature, the amount by which the said datum temperature must be decreased in order to prevent the engine entering a surge region, means for subtracting the second and third electric signals from the first electric signal to derive a fourth electric signal which represents the difference between the actual engine temperature and the datum temperature when decreased by the said amount, a unidirectionally electrically conductive device supplied with the fourth electric signal and arranged to pass that signal only when it is of a polarity indicating that the actual engine temperature has exceeded the datum temperature when decreased by the said amount, control means responsive to the output of the unidirectionally conductive device to control the supply of fuel to the engine in the sense to tend to decrease that fuel supply, means responsive to the actual engine temperature to generate a fifth electric signal as a function of the rate of change of the actual engine temperature, and means for modifying the fourth electric signal as a function of the fifth electric signal such that, when the actual engine temperature does not exceed the datum temperature when modified by the said amount and when the rate of change of the function of the rate of change of the actual engine temperature exceeds a predetermined value, the polarity of the fourth electric signal will be changed such that the modified fourth electric signal will be passed by the unidirectionally conductive device.

2. A control system according to claim 1, which includes a differentiating circuit supplied with the fourth electric signal and arranged to generate the fifth electric signal therefrom.

3. A control system according to claim 1, wherein the means for deriving the fourth electric signal comprises means for subtracting the second electric signal from the first electric signal to derive an intermediate electric signal which represents the difference between the actual engine temperature and the datum temperature, and means for subtracting the third electric signal from the intermediate electric signal to derive the fourth electric signal.

4. A control system according to claim 3, which includes a differentiating circuit supplied with the fourth electric signal and arranged to generate the fifth electric signal therefrom.

5. A control system according to claim 1, wherein the means for generating the third electric signal comprises means responsive to compressor-turbine speed to generate a sixth electric signal which is a linear function of compressor-turbine speed means responsive to compressor-turbine speed to generate a seventh electric signal which is a non-linear function of compressor-turbine speed, means responsive to the difference between the sixth and seventh electric signals to generate an eighth electric signal which is a non-linear function of compressor-turbine speed, and means supplied with the eighth electric signal and responsive to ambient temperature to modify the eighth electric signal as a function of ambient temperature and thereby to generate the third electric signal.

6. A control system for a gas-turbine engine which includes a compressor-turbine, the system comprising means for generating a first electric signal which represents a datum temperature which the actual engine temperature should not generally exceed, means for generating a second electric signal which represents the actual engine temperature, means for subtracting the second electric signal from the first electric signal to derive an intermediate electrical signal which represents the difference between the actual engine temperature and the datum temperature, means responsive to compressor-turbine speed and to ambient temperature to generate a third electric signal which represents, at any given compressor-turbine speed and at any given ambient temperature, the amount by which the said datum temperature must be decreased in order to prevent the engine entering a surge region, amplifying means supplied with the intermediate and the third electric signals and arranged to generate therefrom a fourth electric signal which represents the difference between the actual engine temperature and the datum temperature when decreased by the said amount, a unidirectionally electrically conductive device supplied with the fourth electric signal and arranged to pass that signal only when it is of a polarity indicating that the actual engine temperature has exceeded the datum temperature when decreased by the said amount, control means responsive to the output of the unidirectionally conductive device to control the supply of fuel to the engine in the sense to tend to decrease that fuel supply, a differentiating circuit associated with the amplifying means and supplied with the fourth electric signal to derive a fifth electric signal as a function of the rate of change of the difference between the actual engine temperature and the datum temperature when decreased by the said amount, and means for modifying the fourth electric signal as a function of the fifth electric signal such that, when the actual engine temperature does not exceed the datum temperature when modified by the said amount and when the rate of change of the difference between the actual engine temperature and the datum temperature when decreased by the said amount exceeds a predetermined value, the polarity of the fourth electric signal will be changed such that the modified fourth electric signal will be passed by the unidirectionally conductive device.

7. A control system according to claim 6, which includes a derivative feedback circuit connected between the output and the input of the amplifying means and forming the said differentiating circuit.

8. A control system according to claim 6 which includes a rectifier which constitutes the said unidirectional conductive device.

9. A control system for a gas-turbine engine which includes a compressor-turbine, the system comprising means for generating a temperature characteristic which is a function of a datum temperature and of compressor-turbine speed and of ambient temperature and which defines at least in part the boundary of a surge region of the engine, means for generating a control signal as a function of actual engine temperature, said control signal being of a predetermined polarity when said engine temperature exceeds said characteristic, a unidirectionally electrically conductive device operable to pass said control signal when of said predetermined polarity, control means responsive to the output of said unidirectionally conductive device to control the flow of fuel to the engine in the sense to reduce the fuel flow, and means responsive to a function of the rate of change of the actual engine temperature below said characteristic and in the region of the said boundary of said surge region to produce a further control signal of said predetermined polarity to tend to be passed by said unidirectionally conductive device to reduce the said fuel flow.

10. A control system for a gas-turbine engine which includes a compressor-turbine, the system comprising means for generating a temperature-difference signal representing the difference between engine temperature and a temperature characterisic, the temperature characteristic representing in part an upper datum temperature and in part a maximum allowable temperature which is a function of compressor-turbine speed and of ambient temperature and which defines a boundary of a surge region of the engine, said temperature-difference signal being of a given polarity if said engine temperature rises above said predtermined temperature characteristic, a unidirectionally electrically conductive device operable to pass said temperature-difference signal when of said given polarity, control means responsive to the output of said unidirectionally conductive device to control the flow of fuel to the engine in the sense to reduce the fuel flow, and means responsive to a function of the rate of change of said engine temperature to generate a modifying signal of said given polarity to be passed by said unidirectionally conductive device to tend to reduce said fuel flow to prevent the engine entering said surge region.

11. A control system according to claim 10, which includes differentiating means supplied with said temperature-difference signal and arranged to generate said modifying signal therefrom.

12. A control system for a gas-turbine engine which includes a compressor-turbine, the system comprising means responsive to compressor-turbine speed and to ambient temperature for generating an electric signal which represents, for any given compressor-turbine speed and any given ambient temperature, a datum temperature which the engine temperature must not exceed if engine surge is to be prevented, means for deriving a temperature-difference signal representing the difference between said engine temperature and said datum temperature, whereby said temperature-difference signal would be of a predetermined polarity if said engine temperature exceeded said datum temperature, unidirectionally electrically conductive means arranged to pass said temperature-difference signal only when of said predetermined polarity, control means responsive to the output of said unidirectionally conductive means to tend to reduce the fuel flow to said engine, means for generating a modifying signal as a function of the rate of change of said engine temperature, said modifying signal being of said predetermined polarity when said engine temperature increases, and means for applying said modifying signal to said unidirectionally conductive device to pass said modifying signal to control means to tend to reduce said fuel flow.

13. A control system according to claim 12 which includes differentiating means supplied with said temperature-difference signal and arranged to generate said modifying signal therefrom.

References Cited by the Examiner

UNITED STATES PATENTS

| | | | |
|---|---|---|---|
| 2,727,356 | 12/1955 | Brandau | 60—39.14 |
| 2,741,086 | 4/1956 | Machlanski | 60—39.14 |
| 2,743,578 | 5/1956 | Hazen | 60—39.28 |
| 2,851,855 | 9/1958 | Gamble | 60—39.28 |
| 2,971,337 | 2/1961 | Wintrode | 60—39.28 |
| 2,971,338 | 2/1961 | Rodemuller | 60—39.28 |
| 3,151,450 | 10/1964 | Blackaby | 60—39.14 |
| 3,203,179 | 8/1965 | Blackaby | 60—39.28 |

JULIUS E. WEST, *Primary Examiner.*